United States Patent
Shereyk et al.

(10) Patent No.: US 6,926,237 B2
(45) Date of Patent: Aug. 9, 2005

(54) VIBRATION DAMPING CLIP

(75) Inventors: David A. Shereyk, Homewood, IL (US); Thomas A. Benoit, Bourbannais, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/447,445

(22) Filed: May 29, 2003

(65) Prior Publication Data

US 2004/0238698 A1 Dec. 2, 2004

(51) Int. Cl.$^7$ .................................................. F16B 15/00
(52) U.S. Cl. ...................................... 248/71; 248/74.2
(58) Field of Search ......................... 248/71, 74.1, 74.2, 248/74.5; 264/249, 259, 273, 274

(56) References Cited

U.S. PATENT DOCUMENTS

| | | | | |
|---|---|---|---|---|
| 2,355,742 A | * | 8/1944 | Morehouse | 248/68.1 |
| 2,404,531 A | * | 7/1946 | Robertson | 248/68.1 |
| 2,416,427 A | * | 2/1947 | Bonawit et al. | 264/344 |
| 2,795,770 A | * | 6/1957 | Toedtman | 439/886 |
| 2,803,349 A | * | 8/1957 | Talbot | 211/22 |
| 2,946,104 A | * | 7/1960 | Martin | 164/11 |
| 3,606,218 A | | 9/1971 | Enlund et al. | |
| 3,848,839 A | * | 11/1974 | Tillman | 248/74.2 |
| 3,934,802 A | * | 1/1976 | Jennings | 248/71 |
| 3,944,177 A | * | 3/1976 | Yoda | 248/74.2 |
| 4,153,959 A | * | 5/1979 | Omley | 5/259.1 |
| 4,483,268 A | * | 11/1984 | Pichl | 114/65 R |
| 4,722,821 A | * | 2/1988 | Vermilye | 264/273 |
| 4,754,991 A | | 7/1988 | Jordan | 280/661 |
| 4,881,705 A | | 11/1989 | Kraus | 248/74.2 |
| 5,002,243 A | * | 3/1991 | Kraus et al. | 248/68.1 |
| 5,033,701 A | | 7/1991 | Kraus | 248/68.1 |
| 5,170,984 A | | 12/1992 | Ruckwardt | 248/635 |
| 5,215,281 A | | 6/1993 | Sherman | 248/74.1 |
| 5,257,768 A | | 11/1993 | Juenemann et al. | 248/604 |
| 5,261,633 A | * | 11/1993 | Mastro | 248/74.1 |
| 5,316,245 A | | 5/1994 | Ruckwardt | 248/68.1 |
| 5,398,907 A | | 3/1995 | Kelchner | 248/634 |
| 5,458,303 A | | 10/1995 | Ruckwardt | 248/74.2 |
| 5,464,179 A | * | 11/1995 | Ruckwardt | 248/68.1 |
| 5,539,959 A | * | 7/1996 | Schick | 24/33 B |
| 5,647,713 A | | 7/1997 | Ge et al. | 411/509 |
| 5,669,590 A | | 9/1997 | Przewodek | 248/68.1 |
| 5,704,573 A | | 1/1998 | De Beers et al. | 248/73 |
| 5,742,982 A | | 4/1998 | Dodd et al. | 24/16 R |
| 5,769,556 A | * | 6/1998 | Colley | 403/24 |

* cited by examiner

*Primary Examiner*—Korie Chan
(74) *Attorney, Agent, or Firm*—Mark W. Croll; Paul F. Donovan

(57) ABSTRACT

A vibration damping clip of rigid material in which a softer lining is formed on the holding part of the clip including through an aperture in the holding part so that the lining is physically locked thereto. A similar lock is provided at an entrance or lead-in to the substantially annular holding portion of the clip.

14 Claims, 2 Drawing Sheets

VIBRATION DAMPING CLIP

FIELD OF THE INVENTION

The present invention relates to holding structures used for routing items such as pipes, tubes, wires and the like, and, more particularly, the invention relates to holding structures configured for reducing vibrations transferred between the holding structure and the article to which it is attached.

BACKGROUND OF THE INVENTION

Numerous types of holding devices are known for routing items such as tubes, pipes, wires, rods and the like. The holding device commonly includes some type of anchoring fixture for securing the holding device to the article on which it is used. The anchoring fixture can be a threaded part, a compressible clip for inserting into a hole, a mounting plate with holes for bolts, screws, rivets or the like, or any of a variety of other constructions that can be used to attach the holding device to the article, such as, for example, an automobile. The holding device will further include a holding part that holds the pipe, tube, rod, wire or other item or thing to be held.

Such holding devices are used extensively in the automotive industry for routing wires, brake lines and other similar items. In some applications for such mounting structures, it is desirable to provide vibration isolation between the item being held and the article to which the mounting structure is attached. For example, in routing brake lines through an automobile, mounting clips are secured to the automobile frame and are configured for holding the brake lines therein. During use of the braking system, particularly anti-lock brake systems, pulses can be created in the brake fluid running through the brake lines. The pulses create vibrations and noise in the brake line, which can be transmitted through the mounting clip to the frame of the vehicle. It is desirable to reduce the noise and vibrations transmitted through the clip from the brake line to the vehicle frame.

It is known to provide such mounting clips of comparatively rigid plastic material and to line the part thereof in contact with the brake line or other item with a synthetic rubber or other elastomer of low durometer, energy absorbing characteristics. A problem has been experienced with some clips of this type in that the rubber lining can become dislodged from the mounting structure. If not in the proper position, the vibration and noise damping performance of the liner can be reduced.

It is also known to configure the holding device with a substantially annular portion having open ends through which the brake line or other elongated item is routed. The substantially annular portion has a slit extending between the open ends providing a restricted opening to the space therein, narrower than the diameter of the brake line or other item to be held therein. Wall edges along the access or lead-in to the substantially annular portion are configured to flex outwardly as the brake line is forced therein, and to return toward each other to securely engage the brake line. In pushing the brake line or other item through the restricted opening, it has occurred that the rubber lining becomes dislodged along the lead-in edges. The force from the item and friction against the lining can cause the lining to roll away from the edges to the slot.

What is needed in the art is a vibration damping clip in which the energy absorbing lining is securely held to the mounting structure and does not become dislodged accidentally during pre-assembly, assembly or use.

SUMMARY OF THE INVENTION

The present invention provides a vibration damping clip with a rubber lining, including through an aperture so that the rubber lining is physically locked to the body of the clip. A similar lock is provided at an entrance or lead-in to the substantially annular holding portion of the clip.

In one form thereof, the present invention provides a holding device with an anchor part for attaching the device to an article, and a holding part connected to the anchor part. The holding part includes a wall defining a space therein configured to receive an item to be held by the holding part. The holding part further defines an aperture. A liner is provided on the wall in the space. The liner includes a portion thereof extending through the aperture, the portion being monolithic with the liner outside of the aperture.

In another form thereof, the present invention provides a vibration damping clip with an anchor part of relatively more rigid plastic material configured for attaching the clip to an article, and a holding part integral with the anchor part. The holding part defines a space therein configured to receive an item to be held by the holding part. The holding part further defines an aperture. A liner of material relatively more soft than the rigid plastic material lines the holding part for engaging an item held thereby. The liner includes monolithic portions on opposite sides of the aperture and within the aperture.

In still another form thereof, the present invention provides a method of manufacturing a vibration damping holding device. The method has steps of providing an anchor part of relatively more rigid material configured for attaching the clip to an article, and a holding part integral with the anchor part defining a space therein configured to receive an item to be held by the holding part; providing an aperture in the holding part; providing a liner material relatively more soft than the rigid material; forming a liner of the liner material to line the space; and forming a mechanical lock between the liner and the holding part by forming a plug of the liner material through the aperture, the plug being monolithic with portions of the liner on opposite ends of the aperture.

An advantage of the present invention is providing a vibration damping clip that is easy to manufacture cost effectively, and which includes an energy absorbing layer to reduce the transmission of noise and vibration through the clip.

Another advantage of the present invention is providing a vibration damping clip having a mounting structure of relatively rigid material and a lining of relatively soft material in which the lining is physically locked to the mounting structure.

Still another advantage of the present invention is providing a vibration damping clip having a relatively rigid mounting structure and a relatively soft lining therefor in which the lining is not easily dislodged at end edges thereof or at the access opening to the clip.

Other features and advantages of the invention will become apparent to those skilled in the art upon review of the following detailed description, claims and drawings in which like numerals are used to designate like features.

Figure 1:
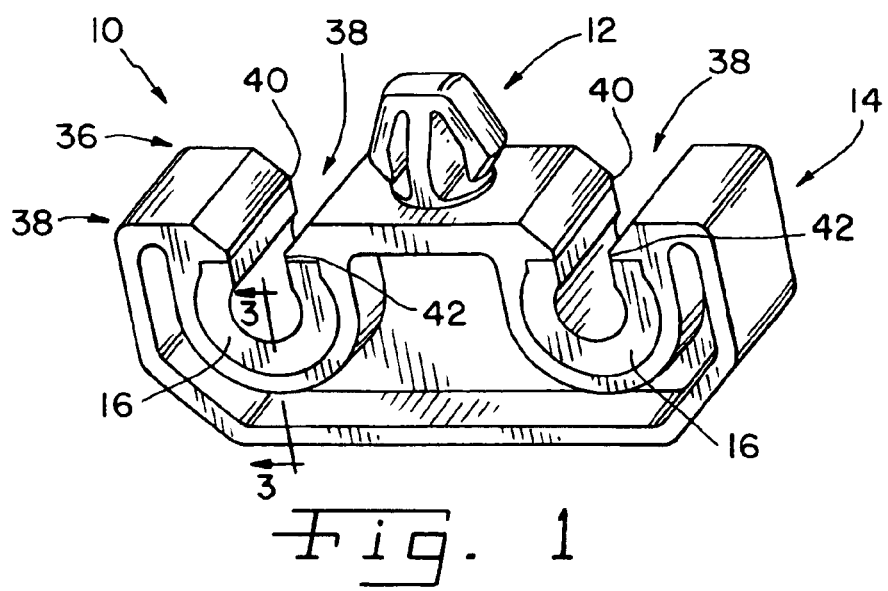
FIG. 1 a perspective view of a vibration damping clip in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a holding device in the nature of a vibration damping clip in accordance with the present invention. Clip 10 includes a monolithic body of relatively rigid plastic material, such as nylon, forming an anchor part 12 and a holding part 14, and a holding part liner 16 of relatively softer material attached to holding part 14.

It should be understood that vibration damping clip 10 of the present invention can be configured for holding a variety of items such as, but not limited to break lines, tubes, wires and the like. Further, vibration damping clip 10 of the present invention can be configured for attachment to a variety of different articles, such as, but again not limited to automobiles, or different areas on the articles, such as the frame, body or other parts of an automobile. In that regard, the particular configurations of anchor part 12 and holding part 14 shown and to be described herein are merely exemplary of a suitable application and use of the present invention. The particular configuration of anchor part 12 for attachment to different articles, and of holding part 14 with respect to the items to be held should not be viewed as limiting of the present invention.

Anchor part 12 as shown includes a pedestal 18 and oppositely directed and outwardly angled arms 20 and 22. As thus configured, anchor part 12 is suitable for inserting into a hole slightly narrower than the distance between arms 20 and 22 at the greatest dimension thereof. Arms 20 and 22 deflect inwardly toward pedestal 18 as anchor part 12 is inserted into such a hole, and spring outwardly after having passed through the hole to secure vibration damping clip 10 to the particular article to which it is attached. Those skilled in the art will readily understand that anchor part 12 can also be configured as a threaded stud, a plate with holes for receiving bolts, rivets, screws and the like; or anchor part 12 can be otherwise configured for attaching vibration damping clip 10 to the article on which it is used.

In the exemplary embodiment shown, holding part 14 defines two holding areas 24 and 26 on opposite sides of anchor part 12. However, holding part 14 may include more or fewer holding areas than the two holding areas 24 and 26 shown. Further, the relationship between the holding area or areas and anchor part 12 can differ for different applications of the present invention. For example, all holding areas may be provided on one side of anchor part 12 or may be directed differently than as shown with respect to anchor part 12.

Each holding area 24, 26 includes a wall 30 defining a space 32 for holding the item or items to be held therein. Wall 30 is a partial, substantially annular body having opened ends 34 and 36 through which the item or items to be held, such as a brake line, can extend. While shown as substantially round, wall 30 and space 32 defined thereby can be of other shapes such as oval, rectangular or complex combination geometric shapes, depending on the intended use for clip 10. Access to space 32 within wall 30 is made through a slot 38 defined by edges 40 and 42 of wall 30. Edges 40 and 42, and slot 38 defined thereby, extend the full length of wall 30 between ends 34 and 36. Edges 40 and 42 are inwardly tapered to provide rigid lead-in surfaces 44 and 46 for the item or items to be placed in holding areas 24, 26.

Holding part 14 defines one or more apertures 48. In the first exemplary embodiment shown, a rib 50 is inwardly directed in space 32 from wall 30, and aperture 48 is provided in rib 50. Depending on the particular size and shape of each holding area 24, 26 and the walls 30 thereof forming the holding areas 24 and 26, a plurality of such apertures 48 may be provided. In the embodiment shown in FIG. 2 each holding area 24, 26 includes three apertures 48, but more or fewer apertures 48 can be used.

Figure 2:
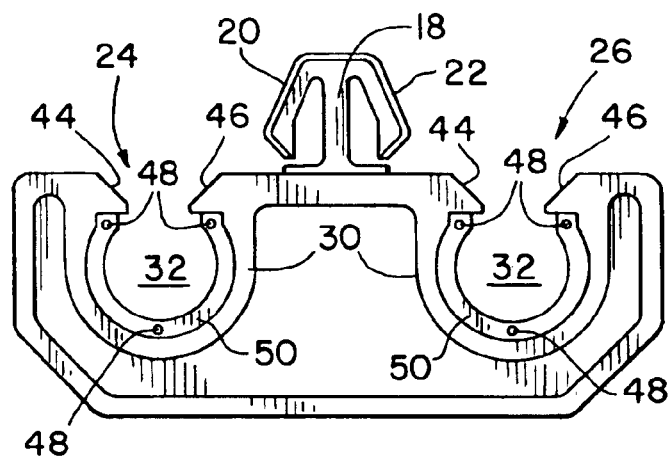
FIG. 2 is an elevational view of the mounting structure with the rubber lining removed for the vibration damping clip shown in FIG. 1.
Figure 3:
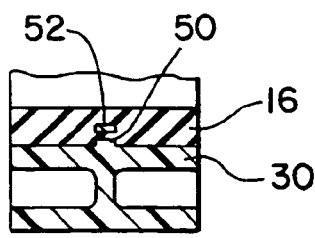
FIG. 3 is a cross-sectional view of the vibration damping clip shown in FIG. 1, taken along line 3—3 of FIG. 1.

Holding part liner 16 substantially covers the inner surface of wall 30 within space 32, and forms the contact surface for the item or items to be held in each holding area 24, 26. Liner 16 is a material softer than the relatively rigid material used for anchor part 12 and holding part 14. The material of liner 16 is energy absorbing to dampen vibration or noise transmitted between the item or items held by clip 10 and the article to which clip 10 is attached. As shown in FIGS. 1–3, liner 16 is a monolithic body of material substantially covering wall 30, engulfing rib 50 and filling apertures 48. Thus, liner 16 is a monolithic body of material on opposite sides of rib 50, and includes a plug 52 thereof extending through aperture 48 integral with liner 16 outside of aperture 48. The monolithic structure of liner 16 and plug 52 thereof, on opposite sides of and filling aperture 48, mechanically locks liner 16 in holding areas 24 and 26, with rib 50 holding liner 16 in proper position end to end, and plug or plugs 52 inhibiting liner 16 from pulling away from wall 30.

Synthetic thermoplastic elastomers such as Santoprene♦ from Advanced Elastomer Systems are suitable materials for liner 16. Those skilled in the art will readily understand the procedures by which over-molding processes can be used for the application of liner 16 on holding part 14.

Figure 4:
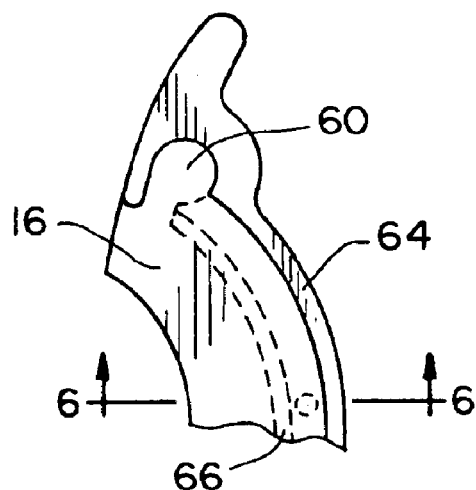
FIG. 4 is a plan view of one of the lead in portions of the vibration damping clip shown in FIG. 1.
Figure 5:
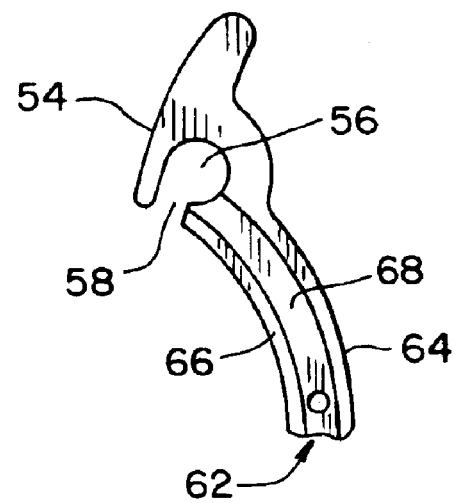
FIG. 5 is a plan view similar to that of FIG. 4 but with the rubber layer removed.
Figure 6:
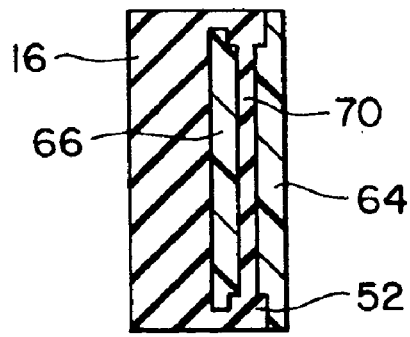
FIG. 6 is a cross-sectional view of the lead in portion shown in FIG. 4, taken on line 6—6 of FIG. 4.

FIGS. 4, 5 and 6 illustrate other features of the present invention. Edges 40 and 42 are configured to protect and somewhat shield the edges of liner 16, and may extend inwardly slightly beyond liner 16 to prevent rolling of liner 16 as the item to be held is forced through slot 38. Edges 40 and 42 also can be configured to function with liner 16 to mechanically lock liner 16 in place at edges 40 and 42. Thus, each edge 40 and 42 defines a column 54 from end 34 to end 36. Column 54 defines a hollow space or eye 56 therethrough, with a restricted opening 58 thereto. During over-molding or other formation of liner 16, lining material is flowed into hollow space 56 and opening 58. Upon solidification, the lining 16 material in hollow space 56 forms a post 60, which is wider than restricted opening 58, and mechanically locks the edges of liner 16 to wall 30 at edges 40 and 42 of slot 38.

To position and retain liner 16 more securely at the ends thereof adjacent ends 34 and 36 of holding areas 24 and 26, wall 30 defines a channel 62 at each end 34, 36. Thus, channel 62 includes an outer wall panel 64 and an inner wall panel 66, with a bottom panel or panels 68 between inner and outer wall panels 66, 64. Inner wall panel 66 is slightly lower than outer wall panel 64, so that liner 16 can be formed on the inside of inner panel 66 and over the top thereof into channel 62. It should be understood that separate channels 62 are thus defined on opposite sides of bottom panel 68. Apertures 48 extend through bottom panel 68, thereby placing channels 62 on opposite ends 34, 36 in flow communication. If sufficiently sized, apertures 48 permit single-shot over-molding for the formation of liner 16. During formation of liner 16, liner material is provided to fill channel 62, forming a lip 70 over inner panel 66 and into channel 62, thereby securing liner 16 to wall 30 at opposite ends 34, 36 thereof. Lip 70 inhibits rolling of liner 16 away from ends 34 and 36 of wall 30.

FIG. 6 illustrates the single body formed by liner 16, lip 70 in channel 62 and plug 52 in aperture 48. By combining all features for liner 16 as a single, monolithic structure, including plugs 52 in apertures 48, posts 60 in columns 54 and lips 70 in channels 62, all edges of liner 16 are thereby secured to wall 30. Liners 16 thereby resist rolling or curling at the edges, and liners 16 are securely locked in position within holding areas 24 and 26.

The present invention provides a vibration damping clip in which the softer, more pliable liner material is securely and mechanically locked to the rigid plastic material forming the main body of the clip. All exposed edges of the liner are securely held in this manner, so that rolling of the liner material from the edge is inhibited, and the liner remains in proper position for optimal performance. Clips and holding devices of various types are readily adaptable to the concepts of the present invention, so that the liners for clips of many different types and configurations can incorporate the features and advantages of the present invention.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A holding device comprising:
   an anchor part for attaching said device to an article;
   a holding part connected to said anchor part, said holding part including a wall defining a space therein configured to receive an item to be held by said holding part, said holding part further defining an aperture, said wall having opposite sides and defining a partial, annular body with open ends and a slot in said holding part extending between said ends, said wall including an inwardly directed rib extending from said wall between said opposite sides, and said aperture extending through said rib; and
   a liner on said wall in said space, said liner including a portion thereof extending through said aperture, said liner including a monolithic body in said aperture and over said rib on opposite sides of said aperture.

2. The holding device of claim 1, said holding part including a first channel and a second channel with a panel therebetween.

3. The holding device of claim 2, said monolithic body of material filling said first and second channels and said aperture.

4. The holding device of claim 1, said wall having spaced edges defining the slot between said ends.

5. The holding device of claim 4, said wall including first and second channels at opposite ends of said wall structure, and a panel separating said channels.

6. The holding device of claim 5, said liner filling said channels and said aperture, and lining the interior of said partially annular body.

7. The holding device of claim 6, said wall having edges defining eyes extending from one end of said slot to the other end thereof.

8. The holding device of claim 7, said wall defining restricted access openings to said eyes, and said liner substantially filling said channels, said restricted access openings and said eyes.

9. A vibration damping clip comprising:
   an anchor part of relatively more rigid plastic material, said anchor part configured for attaching said clip to an article;
   a holding part integral with said anchor part, said holding part defining a space therein configured to receive an item to be held by said holding part, said holding part further defining an aperture, said holding part having a wall having opposite sides and defining a partial annular body with open ends, a slot in said holding part extending between said ends, said wall including an inwardly directed rib extending from said wall between said opposite sides such that said aperture extends through said rib, and said wall forming annular lead-in surfaces at said slot leading into space;
   a liner of material relatively more soft than said rigid plastic material, said liner lining said holding part for engaging an item held thereby; and
   said holding part and said liner mechanically locked to each other via said aperture formed in said anchor part and said liner including monolithic portions on opposite sides of said aperture and within said aperture, such that said lead-in surfaces are configured to protect and somewhat shield edges of the liner, and extend inwardly slightly beyond the liner to prevent rolling of the liner as the item to be held is forced through the slot.

10. The vibration damping clip of claim 9, said holding part including said wall defining a first channel and a second channel with said rib therebetween.

11. The vibration damping clip of claim 10, said liner including a monolithic body of said relatively more soft material lining said holding part and filling said first and second channels and said aperture.

12. The vibration damping clip of claim 9, said wall including first and second channels at opposite sides of said wall, and said rib separating said channels.

13. The vibration damping clip of claim 9, said wall having edges at said slot, said edges defining columns from one of said ends to the other of said ends, said columns forming a rigid lead-in surface to said space of said holding part.

14. The vibration damping clip of claim 13, said columns being hollow and said liner being a monolithic body lining said holding part, and filling said columns.

* * * * *